Dec. 18, 1934.　　T. D. WILLIAMS　　1,984,717
SHEAR DEVICE
Filed June 21, 1934　　5 Sheets-Sheet 3
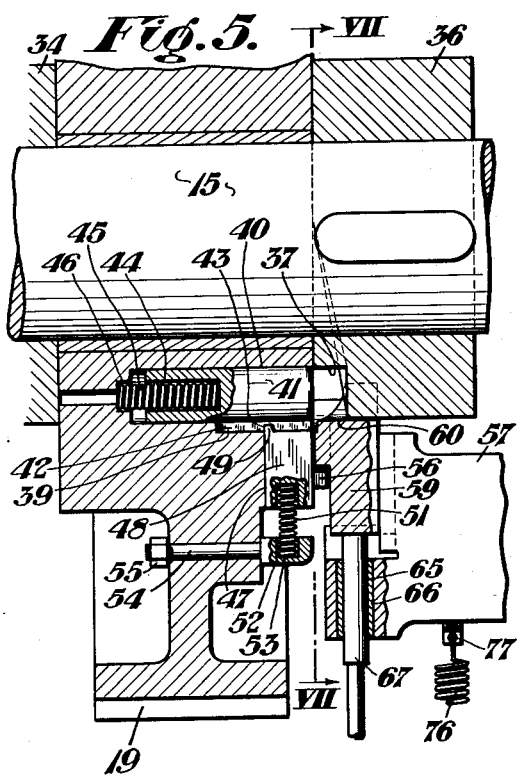
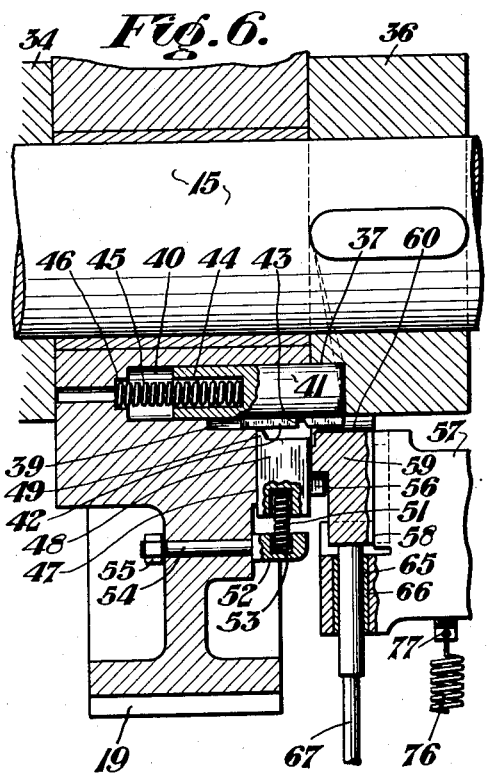
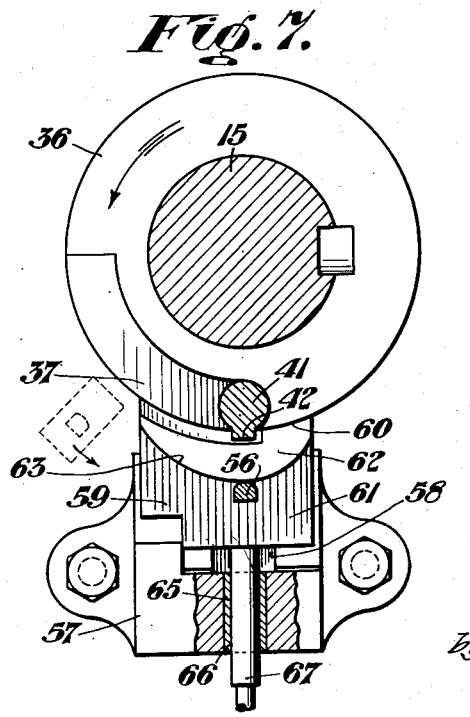
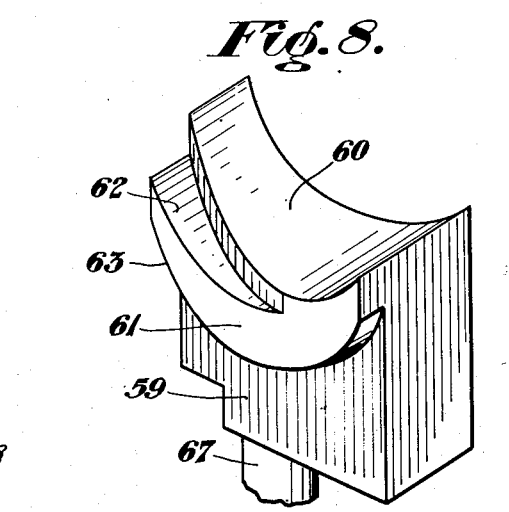
Inventor:
THOMAS D. WILLIAMS
by Usina & Rauber
his Attorneys.

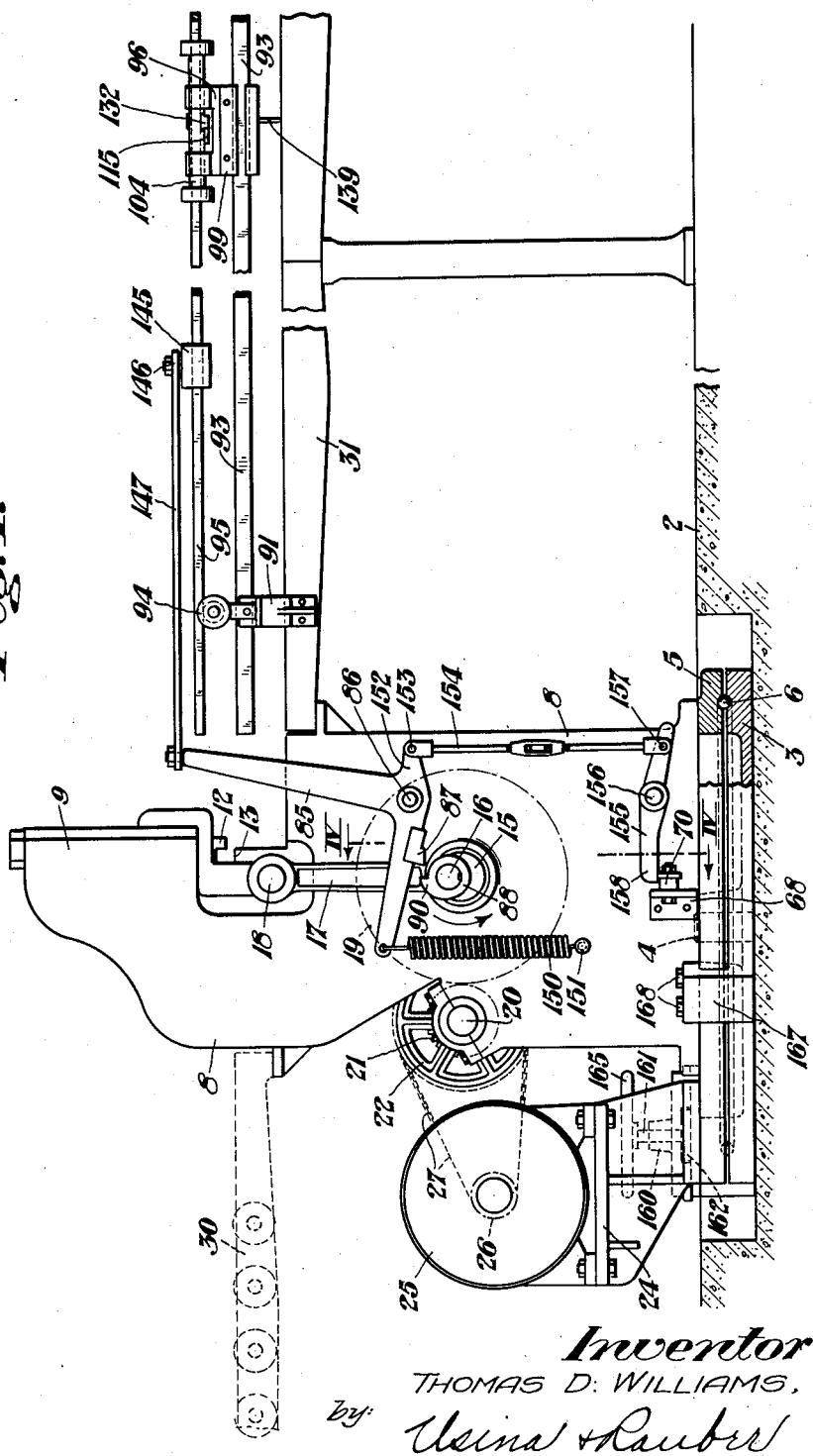

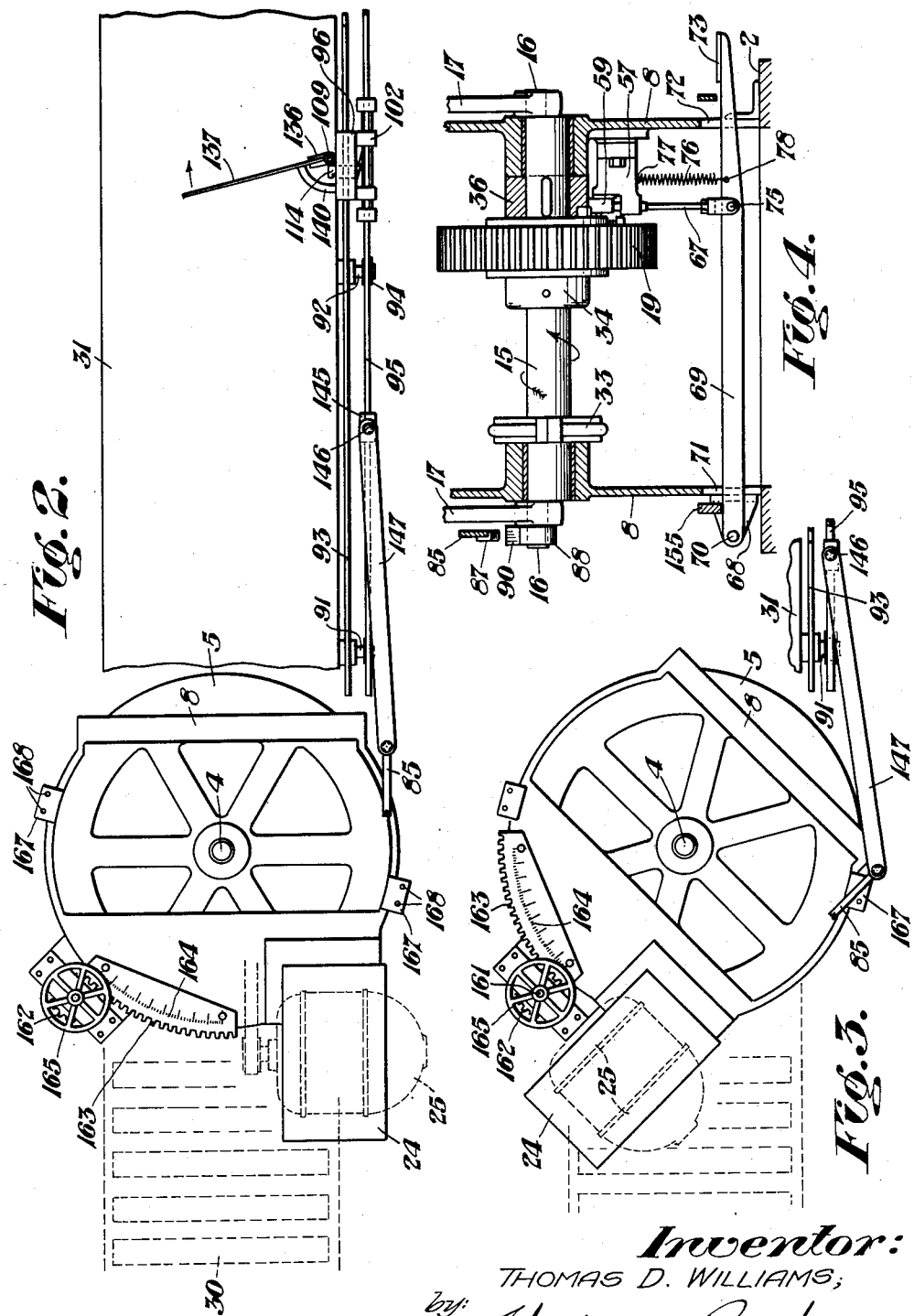

Dec. 18, 1934.   T. D. WILLIAMS   1,984,717
SHEAR DEVICE
Filed June 21, 1934   5 Sheets-Sheet 4

Inventor:
THOMAS D. WILLIAMS,
by: Usina & Rauber
his Attorneys.

Dec. 18, 1934.  T. D. WILLIAMS  1,984,717
SHEAR DEVICE
Filed June 21, 1934  5 Sheets-Sheet 5
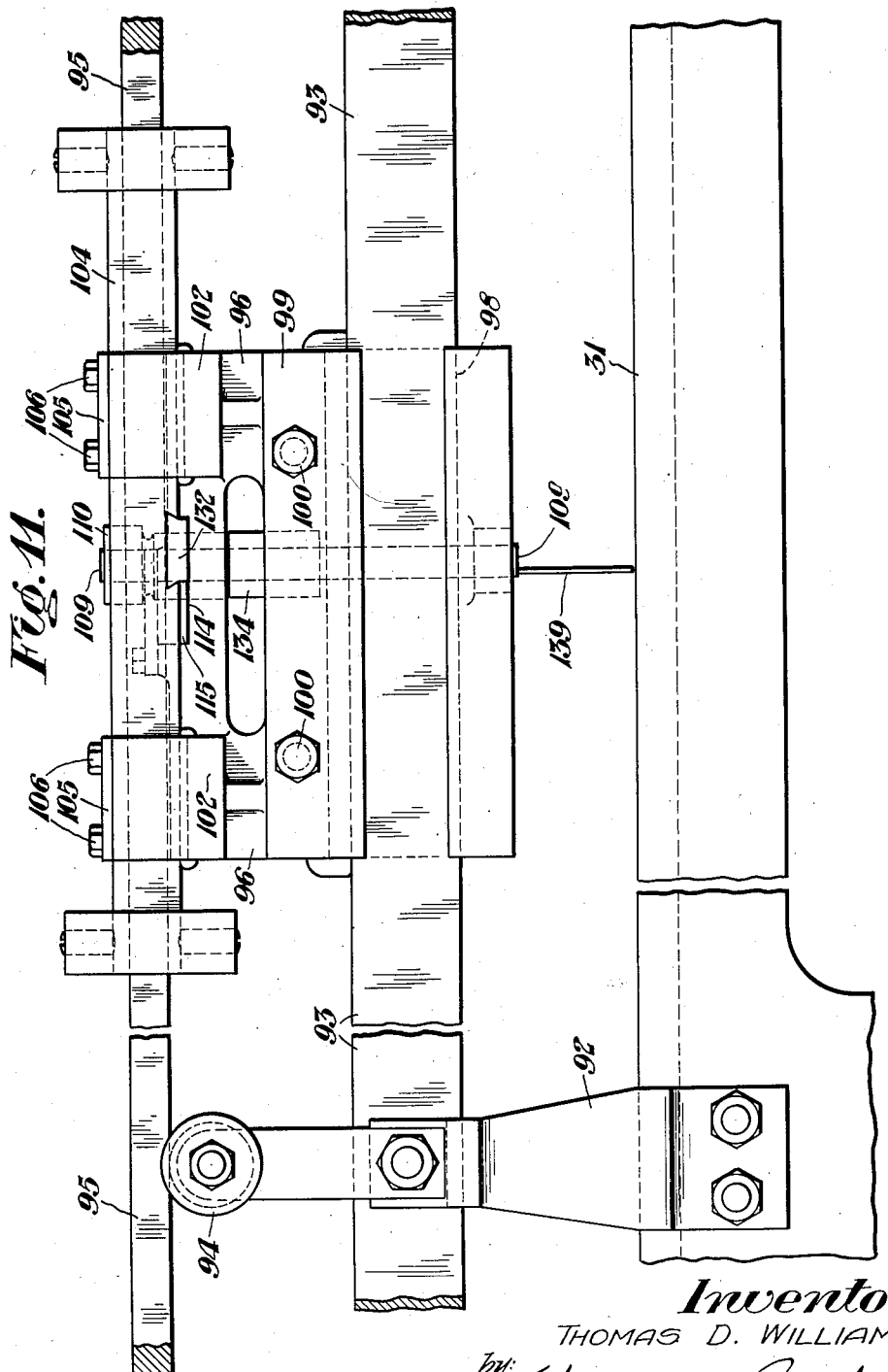
Inventor:
THOMAS D. WILLIAMS,
by Usina & Rauber
his Attorneys.

Patented Dec. 18, 1934

1,984,717

UNITED STATES PATENT OFFICE 1,984,717

SHEAR DEVICE

Thomas D. Williams, Garfield Heights, Ohio

Application June 21, 1934, Serial No. 731,753

3 Claims. (Cl. 164—47)

This invention relates to a novel shear device and more particularly to one which is intended to cut variable lengths of strip metal, although not limited thereto.

One of the objects of the invention is the provision of a shear device which can be made to cut strip metal or the like on one of a number of angles, being easily and rapidly susceptible to movement into the desired position.

Another object is to provide a device of the class described which can be rapidly and accurately adjusted to make a cut on one of a number of angles, and once adjusted will be operated automatically by the material being sheared.

A further object is the provision of a shear device which will be operated automatically by the material being sheared, and one which can be adjusted to make a cut on an angle without adjustment of its automatically operated mechanism.

These and still further objects will be apparent after referring to the drawings, in which:

Figure 1 is a side elevation of the apparatus of the invention.

Figure 2 is a plan of the apparatus of Figure 1.

Figure 3 is a view similar to Figure 2 but showing the apparatus in another position.

Figure 4 is an elevation of the lower part of the apparatus, a portion of which is shown in section.

Figure 5 is an enlarged sectional detail.

Figure 6 is a view similar to Figure 5, but showing the elements of the detail in another position.

Figure 7 is an end view on the line VII—VII of Figure 5.

Figure 8 is a perspective of a detail.

Figure 11 is a side elevation of the apparatus of Figure 9.

Figure 9:
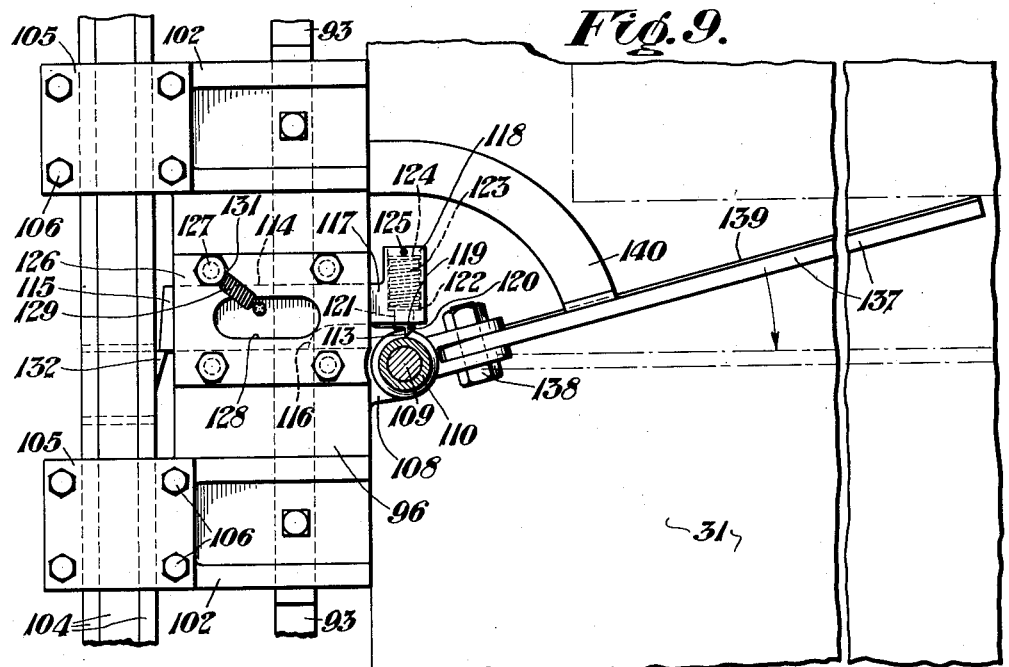
Figure 9 is an enlarged plan of another part of the apparatus.
Figure 10:
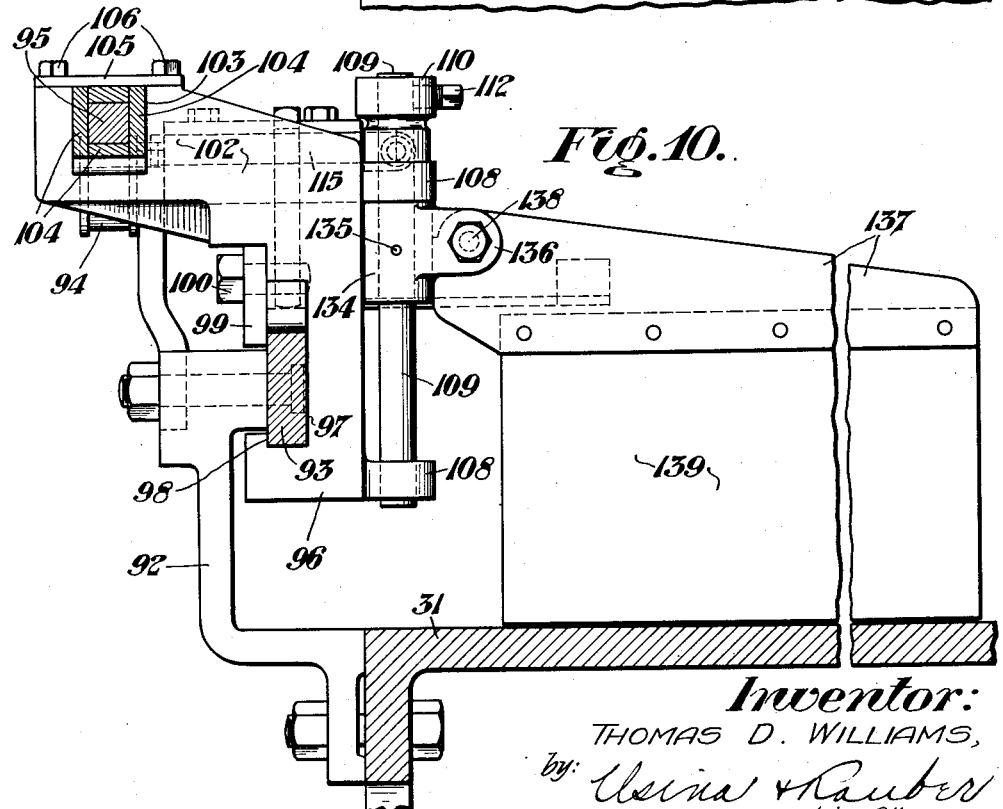
Figure 10 is a sectional view of the apparatus of Figure 9.

Referring more particularly to the drawings, the numeral 2 designates a foundation upon which there is disposed an enlarged bearing race 3. The bearing race 3 is provided with a centrally disposed pin 4 upon which there is journaled an enlarged bearing race 5. A number of ball bearings 6 are disposed between the races 3 and 5 adjacent their circumferences for enabling the relative and antifrictional movement of the upper race 3.

A shear housing 8 is carried by the upper bearing race 5 and provided with a cross-head 9. This cross-head 9 supports a reciprocating head 10 which carries a knife-blade 12. A cooperating and stationary knife-blade 13 is disposed immediately below the knife-blade 12, being secured to the housing 8.

A shaft 15 is journaled in the housing 8 below the stationary knife-blade 13 and carries on each of its ends an eccentric 16 to each of which there is connected one end of a connecting-rod 17. The other ends of the connecting-rods 17 are connected to the lower and outside ends of the reciprocating cross-head 10, as shown at 18. A gear 19 is secured to the shaft 15 for enabling its rotation. A shaft 20 is journaled in the housing 8 adjacent the shaft 15 and carries a gear 21 which engages the gear 19. The shaft 20 also carries a larger gear 22.

A support 24 is mounted on the upper bearing race 5 and has secured thereto a motor 25 which is provided with the usual driving gear or pinion 26. The pinion 26 drives the large gear 22, on the shaft 20, through a chain 27.

A feed table 30 is disposed on one side of the shear housing 8 and a runout table 31 on the other.

A friction brake 33 is connected to the shaft 15 for imposing a drag, or resistance, to its rotation.

The gear 19, through which the shaft 15 is rotated, is itself journaled thereon in abutment with a collar 34 which is suitably secured against lateral movement. A clutch collar 36 is keyed on the shaft 15 on the other side of the gear 19. This clutch collar 36 is provided with a tapered groove 37, on its side adjacent the gear 19, which extends only partially around its axis. The gear 19 is recessed at right angles to the tapered groove 37 in the clutch collar 36, as shown at 39, and provided with a communicating recess 40. A pin 41 is adapted for movement in the communicating recess 40 and is provided with a downwardly extending lug 42 which occupies the recess 39. The lug 42 is provided on the intermediate portion of its edge with a detent 43.

The inner end of the pin 41 is recessed, as at 44, to accommodate a spring 45 which also seats in a recess 46 which communicates with the inner end of the recess 40.

The side of the gear 19 which is adjacent the clutch collar 36 is provided with another recess 47 which extends at right angles to the recess 39. A block 48 is disposed to slide in the recess 47 and carries on its inner edge a lug 49 which is adapted to seat in the detent 43 in the lug 42 of the pin 41. The block 48 is recessed on its edge opposite that having the detent 43 for accommodating one end of a spring 51. A cup 52 is provided with a recess 53 in which the other end of the spring 51 is adapted to seat, and is secured to the gear 19 by means of a bolt and nut, 54 and 55 respectively. A lug 56 is provided on the outer surface of the block 48 for a purpose to be later described.

An extension 57 is attached to one side of the housing 8 and provided with a recess 58 which is immediately below the tapered groove 37 in the clutch collar 36. A block 59 is slidably disposed in the recess 58, and provided on its upper edge with a concavity 60 which conforms to the outer surface of the clutch collar 36. The side 61 of the block 59, which is adjacent the gear 19, is provided with a tapered segmental shelf 62. The lower edge of the side 61 of the block 59 is undercut, as at 63, to provide a convexity on a radius similar to that of the concavity 60. This convexity 63 is adapted to engage the lug 56 on the block 48 to force the latter downwardly. The extension 57 is apertured, as at 65, in communication with the recess 58. A bushing 66 is disposed in the aperture 65 for antifrictionally supporting a rod 67 which is connected to the lowermost edge of the block 59.

A plate 68 is secured to the side of the housing 8, opposite that to which the extension 57 is attached, and partially supports a lever 69, as at 70. The lever 69 extends through an aperture 71 in the adjacent side of the housing 8 and through another aperture 72 in the opposite side thereof. The end of the lever 69 which extends through the aperture 72 is provided with a foot pedal 73. The lower end of the rod 67 is connected to the intermediate portion of the lever 69, as shown at 75. A spring 76 is connected to the extension 57, as at 77, and to the lever 69, as at 78, to bias the latter upwardly.

A bell-crank lever 85 is pivoted to one side of the housing 8, as at 86, and carries a dog 87. A cam 88 is secured to the end of the shaft 15 which is below the bell-crank lever 85 and carries a lug 90 which is adapted to engage the dog 87.

A pair of vertical supports 91 and 92 are mounted on one side of the runout table 31 and each is secured to a horizontally extending shaft 93. A roller 94 is carried by each of the vertical supports 91 and 92, above and outwardly from the horizontally extending shaft 93. A reciprocable shaft, or slide-bar 95 is supported by the rollers 94. A housing 96 is secured to the shaft 93 and reciprocably supports the slide-bar 95. Accordingly, the housing 96 is provided with a recess 97 which is undercut, as at 98. The shaft 93 is seated in the recess 97 and rigidly maintained by a clamping plate 99 which is tightly held against the former by capscrews 100.

The housing 96 is provided on both of its ends with an extension 102. Each of the extensions 102 is provided with a recess 103 in which there is disposed a plurality of wear-plates 104 for antifrictional contact with the slide-bar 95. The wear-plates 104 and slide-bar 95 are securely held in the recesses 103 by retainer plates 105 and capscrews 106.

A pair of spaced and vertically alined bearings 108 are integrally formed on the side of the housing 96 opposite the extensions 102. A shaft 109 is disposed in the bearings 108 and carries on its upper extremity a sleeve 110 which is securely held against relative rotation by a setscrew 112. This sleeve is provided on its side with a notch 113. A transverse recess 114 is provided in the housing 96 adjacent the sleeve 110 and carries a sliding plate 115. The sliding plate 115 is provided with a curved recess 116 which is adapted for clearance with respect to the sleeve 110 when the former is moved sufficiently out of the recess 114. The end of the sliding plate 115 which is adjacent the sleeve 110 carries a longitudinal extension 117, which is provided with a transverse integral sleeve 118. A plug 119 is provided on one of its ends with a dog 120 which is adapted to engage the notch 113 on the sleeve 110. The plug extends through an aperture 121 in the extension 117, with its head 122 in the sleeve 118. A spring 123 is disposed in the sleeve 118 for resiliently influencing the plug 119 outwardly, and is itself maintained in position by a washer and lockpin as at 124 and 125, respectively.

A cover plate 126 is disposed over the transverse recess 114 in the housing 96 and held in place by capscrews 127. This cover plate 126 is provided with an aperture 128 through which one end of a spring 129 is connected to the sliding plate 115, as shown at 130. The other end of the spring 129 is connected, as at 131, to one of the capscrews 127.

A pawl 132 is provided on the shaft 95 for engaging the end of the sliding plate 115 which is opposite the longitudinal extension 117, when it is fully withdrawn by the spring 129.

A sleeve 134 is secured to the intermediate portion of the shaft 109 by a pin 135 and is provided with a pair of laterally extending ears 136. An arm 137 is connected between the ears 136, as shown at 138, and carries a downwardly extending plate 139. A stop 140 is secured to the housing 96 for limiting the backward movement of the arm 137.

A sleeve 145 is secured to the shaft 95 and provided with a universal joint 146. A shaft 147 is connected on one of its ends to the universal joint 146, and on its other end to one end of the bell-crank lever 85. The other end of the bell-crank lever 85 is connected to a spring 150 which is connected to the housing 8, as shown at 151.

The bell-crank lever 85 is provided with an extension 152 to which there is connected, as at 153, one end of an adjustable-length shaft 154. A rocking lever 155 is pivoted, as at 156, to the housing 8 immediately below the bell-crank lever 85 and is connected on one of its ends to the other end of the adjustable-length shaft 153, as shown at 157. The other end of the rocking lever 155 extends over the pivoted end of the lever 69, as shown at 158.

A vertical bearing 160 is disposed on the lower bearing race 3 adjacent its periphery and provided with a shaft 161 on the lower end of which there is secured a pinion 162. A curved rack 163 is connected to the upper bearing race 3 for engagement with the pinion 162 and provided with indicia, as shown at 164. A hand-wheel 165 is connected to the upper end of the shaft 161 for rotatably adjusting the upper bearing race 5. The upper bearing race 5 is locked in adjusted position by clamping members 167 which are mounted on the lower bearing race 6. These clamping members 167 are locked against the upper bearing race 5 by capscrews 168.

In operation, the shear housing 8 is rotated until its cross-head 9 is at a suitable angle to the feed and runout tables 30 and 31, respectively, by means of the hand-wheel 165. The housing is maintained in this position by means of the clamping members 167, which rigidly hold the upper bearing race 5 to the lower bearing race 3 by means of the capscrews 168. The motor 25 is continuously driven to rotate the shaft 20 through its pinion 26, chain 27 and gear 22. This shaft 20 rotates the shaft 15 through the gears 21 and 19. However, the gear 19 rotates idly upon the shaft 15 until it is clutched-in. This is automatically done by the strip metal in crossing the run-out table 31. As the strip metal engages the downwardly extending plate 139 on the arm 137, the sleeve 110 is partially rotated, causing its lug 113 to engage the dog 120 on the plug 119, thus moving the sliding plate 115 slightly over the run-out table 31. The slide-bar 95 is released by the movement of the sliding plate 115, and the spring 150 moves the dog 87 on the bell-crank lever 85 into engagement with the lug 90 on the cam 88. This moves the adjustable-length shaft 154 upwardly, lowering the end 158 of the rocking lever 155. The lever 69 is then depressed against the action of the spring 76, causing the downward movement of the shaft 67. The concave surface 60 of the block 59 is thus brought out of contact with the periphery of the clutch collar 36. As the block 59 moves downwardly the undercut edge 63 of its side 61 engages the lug 56 on the block 48, causing it to move in a similar manner.

The lug 49, on the block 48, releases the pin 41 which moves outwardly and seats in the tapered slot 37 in the clutch collar 36. The gear 19 is thus clutched-in and the shear blades 12 and 13 permitted to make one cutting cycle. As the tapered groove 37 on the clutch collar 36 moves the pin 41 back into its recess 40, the lug 49 on the block 48 seats in the detent 43, clutching-out the gear 19. This is because the rotation of the shaft 15 has withdrawn the lug 90, on the cam 88, from contact with the dog 87, on the bell-crank lever 85, and lowered the adjustable-length shaft 154, permitting the spring 76 to raise the shaft 67 to lock the pin 41 in its recess 40. The raising of the adjustable-length shaft 154 moves the slide-bar 95 back into its former position where its pawl 132 is engaged by the adjacent end of the sliding plate 115 if the strip metal has entirely passed the downwardly extending plate 139 on the arm 137. If this is not the case, the shear will continue to operate.

The shear may, if desired, be manually operated by the depression of the foot-pedal 73.

While I have shown and described one specific embodiment of my invention, it will be understood that I do not wish to be limited exactly thereto, since various modifications may be made without departing from the scope of my invention, as defined in the following claims.

I claim:

1. A shear device comprising a rotatable housing, a shear supported by said housing, means for driving said shear, means for adjusting said housing in such manner as to permit said shear to make a cut at one of a number of angles, a runout table on one side of said shear, means for initiating the operation of the means for driving said shear, a slide-bar extending along said runout table, at least one flexible connection between said slide-bar and said initiating means, and means operable by the material to be cut for releasing said slide-bar.

2. A shear device comprising a rotatable housing, a shear supported by said housing, means for driving said shear, means for adjusting said housing in such manner as to permit said shear to make a cut at one of a number of angles, a runout table on one side of said shear, a slide-bar extending along said runout table, means for initiating the operation of the means for driving said shear, at least one flexible connection between said slide-bar and said last named means, a housing through which said slide-bar extends, means tending to withdraw said slide-bar from said housing, means on said housing for restraining said slide-bar against movement, and means operable by the material to be cut for releasing said restraining means.

3. A shear device comprising a rotatable housing, a shear supported by said housing, means including a clutch device for driving said shear, means for adjusting said housing to enable said shear to make a cut at one of a number of angles, a runout table on one side of said shear, a slide bar extending along said runout table, means for holding said slide bar against movement, means disposed in the path of a workpiece progressing over said runout table for releasing said holding means, a lever pivotally mounted on said rotatable housing, a connection between said slide bar and said lever, means for influencing said lever to move in such manner as to withdraw said slide bar, means operable upon said last named movement to engage the clutch device included in the means for driving said shear, and means for disengaging said clutch and returning said lever and said slide bar to their initial positions.

THOMAS D. WILLIAMS.